Sept. 18, 1962 C. R. EDGERLY ET AL 3,054,235
TRAY-LOADING APPARATUS
Filed June 29, 1959 5 Sheets-Sheet 1

INVENTORS
CHARLES R. EDGERLY
WILLIAM J. SUMMERS
ALBERT GORSKI.
BY
ATTORNEY

Sept. 18, 1962 C. R. EDGERLY ET AL 3,054,235
TRAY-LOADING APPARATUS
Filed June 29, 1959 5 Sheets-Sheet 2
FIG. 2.
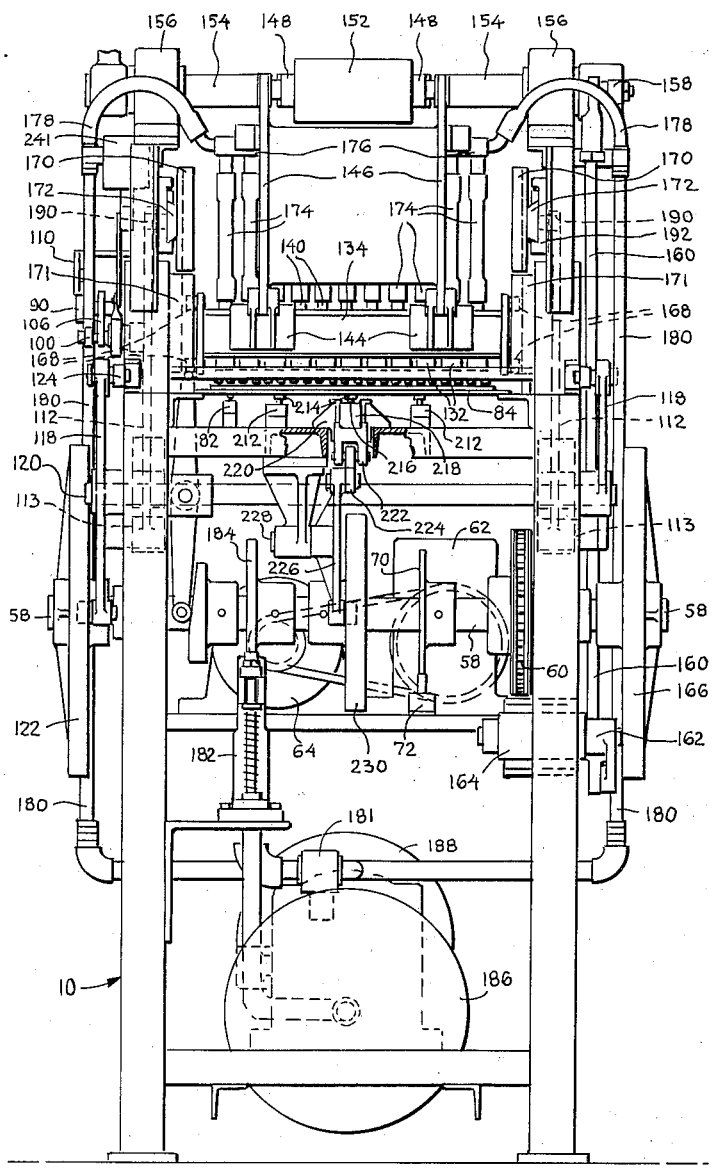
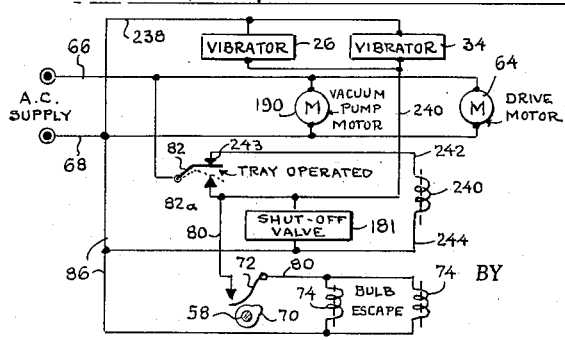
FIG. 14.
INVENTORS.
CHARLES R. EDGERLY,
WILLIAM J. SUMMERS,
ALBERT GORSKI.
BY
ATTORNEY

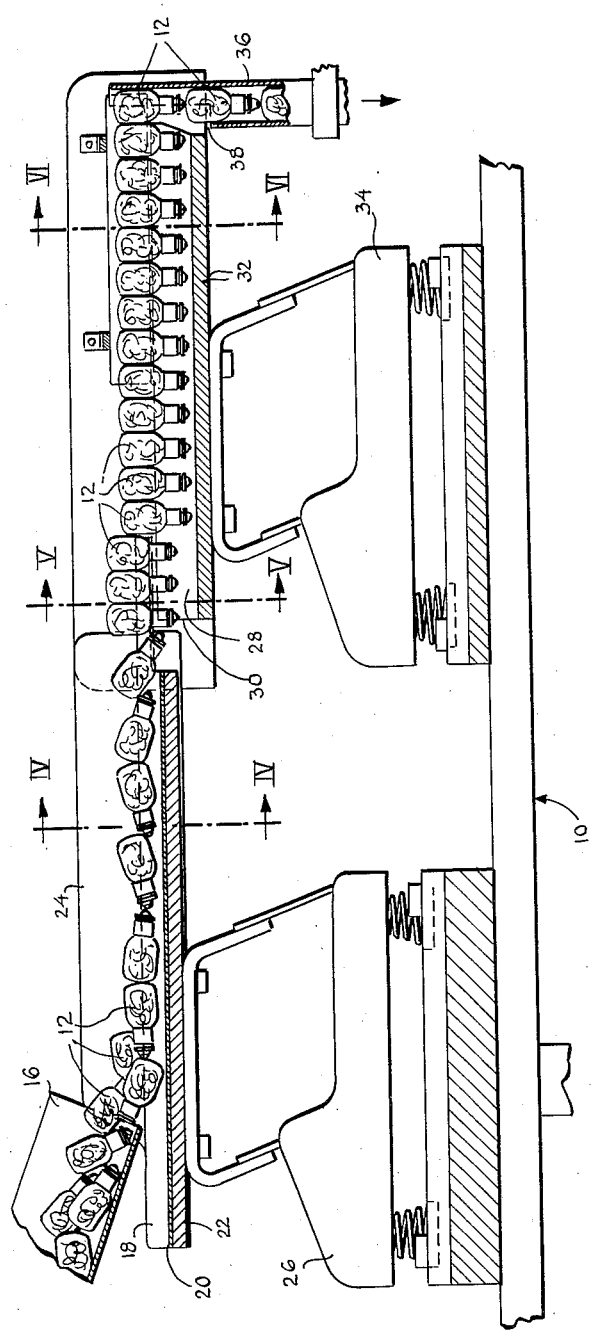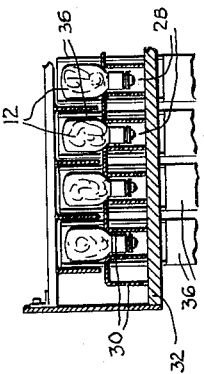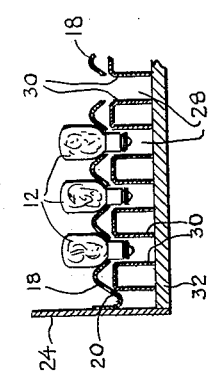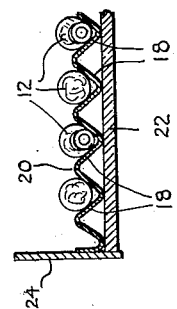

Sept. 18, 1962     C. R. EDGERLY ET AL     3,054,235
TRAY-LOADING APPARATUS
Filed June 29, 1959                                          5 Sheets-Sheet 4
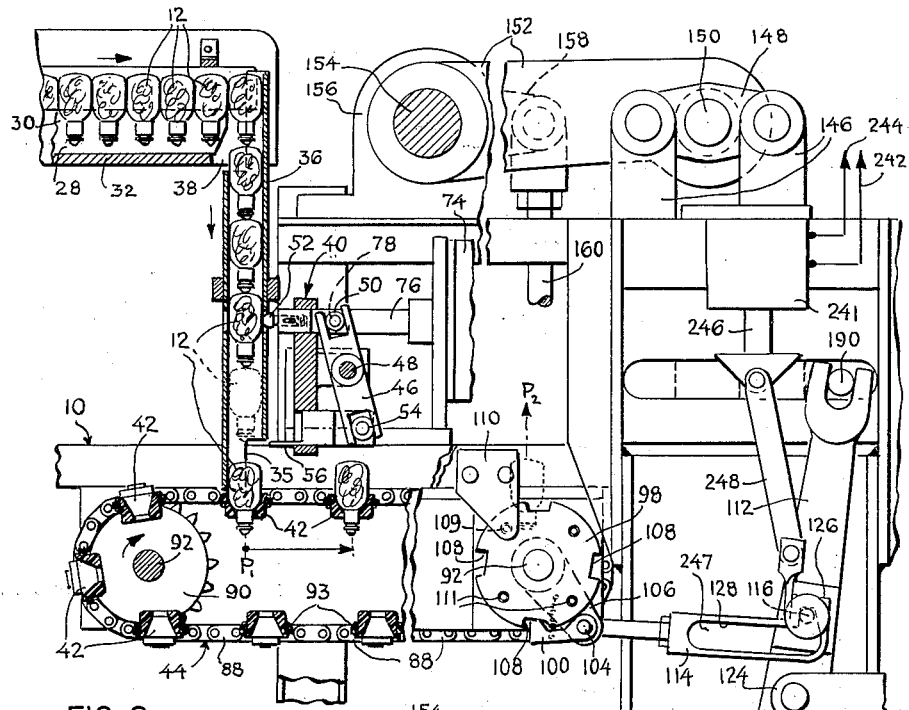
FIG. 7.
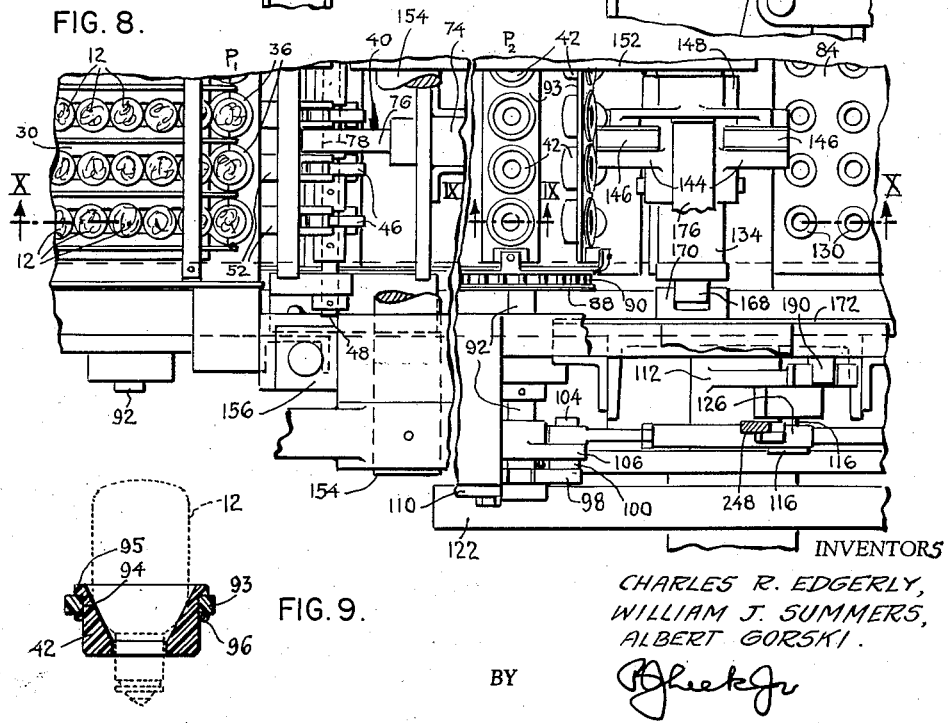
FIG. 8.
FIG. 9.
INVENTORS
CHARLES R. EDGERLY,
WILLIAM J. SUMMERS,
ALBERT GORSKI.
BY
ATTORNEY Sept. 18, 1962  C. R. EDGERLY ET AL  3,054,235
TRAY-LOADING APPARATUS
Filed June 29, 1959  5 Sheets-Sheet 5
FIG. 10.
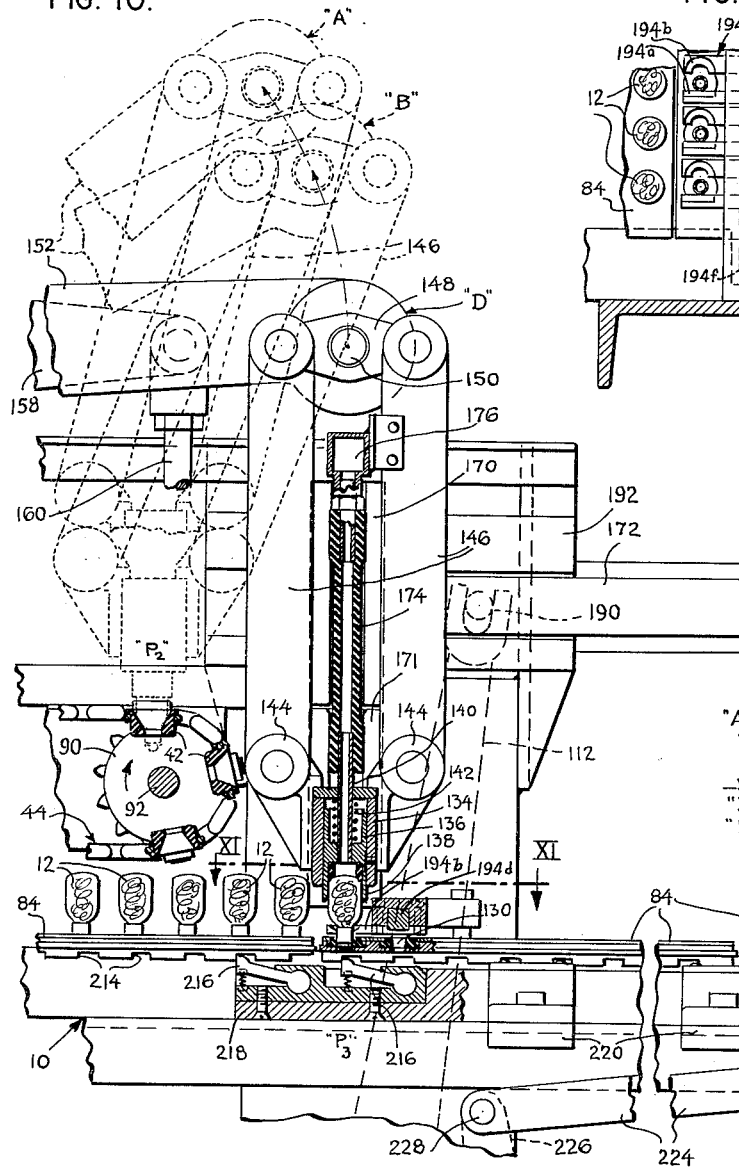
FIG. 11.
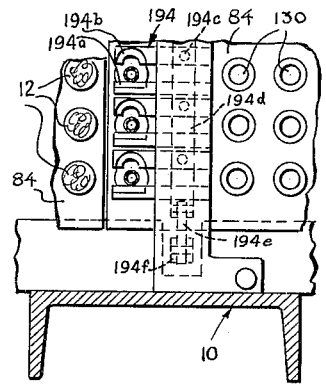
FIG. 15.
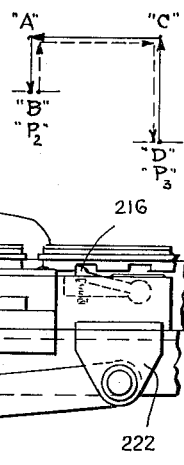
FIG. 12.
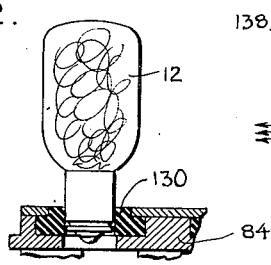
FIG. 13.
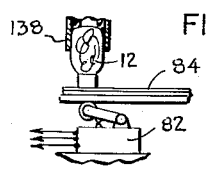
INVENTORS
CHARLES R. EDGERLY,
WILLIAM J. SUMMERS,
ALBERT GORSKI.
BY 
ATTORNEY United States Patent Office 3,054,235
Patented Sept. 18, 1962

3,054,235
TRAY-LOADING APPARATUS
Charles R. Edgerly, Bloomfield, William J. Summers, Verona, and Albert Gorski, West Orange, N.J., assignors to Westinghouse Electric Corporation, East Pittsburgh, Pa., a corporation of Pennsylvania
Filed June 29, 1959, Ser. No. 823,487
13 Claims. (Cl. 53—63)

The present invention relates to the manufacture of photoflash lamps and, more particularly, to apparatus for loading the based photoflash lamps into trays preparatory for coating the outside of the lamp envelopes with a protective lacquer.

In the past photoflash lamps have been based with brass bases which are heavier than the photoflash lamp thus providing the based photoflash lamp with a center of gravity near the brass base and causing such based photoflash lamp to normally be disposed under the influence of gravity in a position where the base rests on the support for the lamp with the longitudinal axis of the lamp disposed at the maximum angle from the horizontal permitted by the support. However, with the introduction of the relatively lighter aluminum bases for photoflash lamps, the center of gravity of such based photoflash lamps was moved toward the center of the lamp envelope with the obvious result that such based photoflash lamps now naturally lie under the influence of gravity in a position where the longitudinal axis of the lamp more closely approaches the horizontal. The center of gravity of the photoflash lamps is further shifted away from the base toward the center of the lamp envelope by the current use of zirconium foil in such lamp envelope, which zirconium foil is heavier than conventional aluminum foil.

Hence, when the based photoflash lamps provided with aluminum bases are fed into an automatic tray-loading machine of the type shown in U.S. Patent No. 2,760,318, issued August 28, 1956, to W. A. Brenneck et al., the aluminum-based photoflash lamps rest on the combing conveyor of such machine in the above-mentioned substantially horizontal position. As a result of this latter position of the lamps, such combing conveyor (which is utilized to align the mass of aluminum-based photoflash lamps) is unable to keep the bases aligned along the longitudinal axis of the lanes. In addition, when such combing conveyor delivers such aluminum-based photoflash lamps in this substantially horizontal position to the tray-loading heads, the latter engages the sides of the envelopes rather than the tops of the envelopes of the aluminum-based photoflash lamps, thereby resulting in breakage of the envelopes and failure of the tray-loading heads to fully load the coating trays disposed therebeneath.

Regardless of the type of bases which are affixed to the photoflash lamps it is desirable during the automatic operation of the above-mentioned tray-loading machine to automatically suspend the operation of such machine in the event that a coating tray is not properly positioned beneath the tray-loading heads. If the tray-loading machine continues to operate under these conditions, the based photoflash lamps fall (when released by the tray-loading heads) onto the floor beneath the tray-supporting frame with considerable breakage and resultant shrinkage. In addition, if the operator dumps an excessive number of based photoflash lamps on the loading end of the combing conveyor, the accumulation of an excessive number of such lamps in the individual lanes of the combing conveyor causes an undesirable increased pressure on the aligned lamps at the delivery end of such combining conveyor. This increased pressure causes a based lamp to rise up from the lane of lamps with attendant jamming of the based photoflash lamps adjacent the tray-loading heads thus preventing proper feeding of the lamps thereinto.

It is the general object of the present invention to avoid and overcome the foregoing and other difficulties of and objections to prior-art practices by the provision of an improved apparatus for loading based photoflash lamps into trays preparatory for the coating of the outside of the envelopes of such lamps with a protective lacquer.

Another object of the present invention is the provision of an improved tray-loading apparatus which operates under controlled conditions, prevents jamming of the based photoflash lamps in such apparatus and remains inoperative when a coating tray is not in position to receive the lamps.

Still another object of the present invention is an improved tray-loading apparatus for photoflash lamps which is operable to efficiently and consistently load aluminum-based photoflash lamps having their centers of gravity near the center of the lamp envelopes and which normally recline under the influence of gravity in a position which is substantially horizontal.

Yet another object of the present invention is the provision of the improved tray-loading apparatus which reduces the shrinkage in the tray-loading operation.

Another object of the present invention is the provision of a novel orienting and feeding means which is operable to accept randomly presented bulbous objects having a larger-diameter portion at one end and a center of gravity located near such larger-diameter portion and to present them in a desired vertical position with the larger-diameter portion at the top.

A further object of the present invention is the provision of transfer means which is adapted to simultaneously transfer a plurality of oriented bulbous articles from an article-transfer position disposed at one level to an article-loading position disposed at another level.

The aforesaid objects of the present invention and other objects which will become apparent as the description proceeds are achieved by providing an improved tray-loading apparatus for based photoflash lamps, comprising means for receiving a group of based photoflash lamps at a delivery zone and for moving such group to a transfer zone, means adjacent the delivery zone for orienting the based photoflash lamps and for feeding the oriented based photoflash lamps, one group at a time, to the lamp-receiving means in the base-down position, transfer means in the transfer zone operable to remove a group of based photoflash lamps from the article-receiving means and to deposit such group in a coating tray positioned in a loading zone adjacent thereto and control means operable to terminate the operation of the lamp-feeding means and the movement of the article-receiving means and the operation of the transfer means, when a tray is not properly positioned to receive the based photoflash lamps from the transfer means or is absent from the loading zone.

For a better understanding of the present invention reference should be had to the accompanying drawings wherein like numerals of reference indicate similar parts throughout the several views and wherein:

FIG. 2 is an end-elevational view of the tray-loading apparatus shown in FIG. 1 when such apparatus is viewed from the right-hand end of FIG. 1.

FIG. 3 is a fragmentary enlarged side-elevational view of the orienting and feeding means employed in the tray-loading apparatus of the present invention.

FIG. 4 is a vertical-sectional view along the line IV—IV of FIG. 3 in the direction of the arrows and showing the based photoflash lamps randomly positioned in the orienting lanes of the orienting and feeding means.

FIG. 5 is a view similar to FIG. 4 taken along the line V—V of FIG. 3 in the direction of the arrows and showing the based photoflash lamps oriented into the desired vertical base-down position and entering the feeding lanes of the orienting and feeding means.

FIG. 6 is a view similar to FIGS. 4 and 5 and showing the oriented based photoflash lamps seated in the feeding lanes adjacent feed tubes which are utilized for the purpose of feeding the oriented based photoflash lamps to lamp-receiving means disposed in a delivery position therebeneath, which lamp-receiving means are mounted on a conveyor and are movable to a lamp-transfer position.

Figure 1:
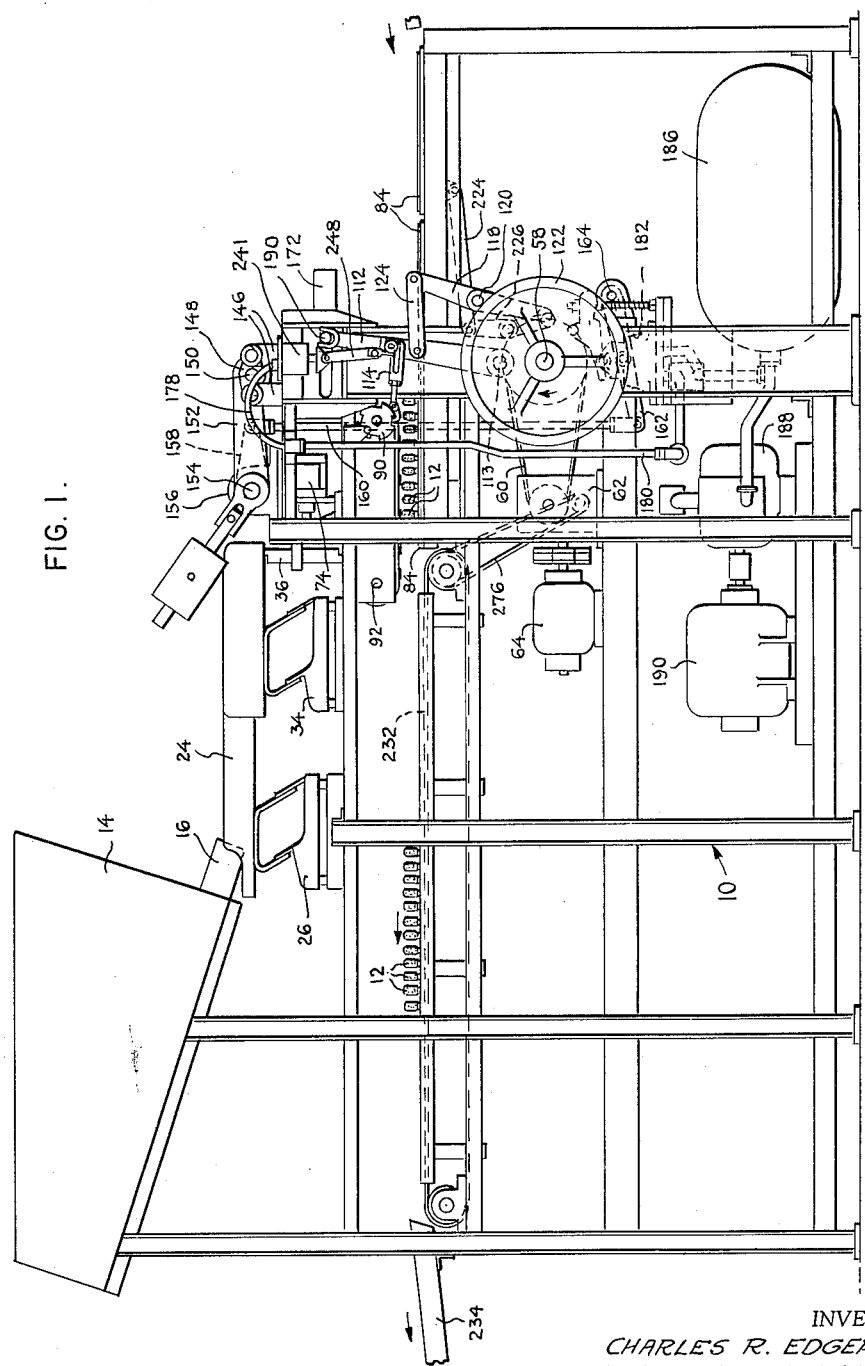
FIG. 1 is a side-elevational view of the tray-loading apparatus of the present invention.

FIG. 7 is a side-elevational view, partially in section, of the delivery ends of the feeding lanes, the feed tubes, lamp-receiving means and an escapement mechanism for feeding the lamps one at a time to the lamp-receiving means in the delivery position and showing also a portion of a transfer means and the drive means for the conveyor, said figure being broken away through the midportions thereof because of the length of the conveyor.

FIG. 8 is a fragmentary plan view of FIG. 7.

FIG. 9 is a vertical-sectional view along the line IX—IX of FIG. 8 in the direction of the arrows and showing the details of the lamp-receiving means.

FIG. 10 is a vertical-sectional view along the line X—X of FIG. 8 in the direction of the arrows of the portion of the lamp-receiving means adjacent the lamp-transfer zone, a tray-advancing and supporting means and the transfer means for transferring the based photoflash lamps from the lamp-receiving means in the transfer position to a coating tray therebeneath disposed in the loading position.

FIG. 11 is a fragmentary horizontal-sectional view along the line XI—XI of FIG. 10 in the direction of the arrows.

FIG. 12 is an enlarged vertical-sectional view of a portion of the coating tray and showing the base-holding means employed to secure the trayed lamps therein.

FIG. 13 is a fragmentary side-elevational view of a switch actuated by the presence of a coating tray in the loading position and utilized to deenergize the orienting and feeding means, the conveyor and the transfer means in the event that a coating tray is not present in the loading position.

FIG. 14 is a diagrammatic view of the circuit for the control means which is operable by the absence of a coating tray in the loading position to terminate the operation of the cooperating means of the tray-loading apparatus.

FIG. 15 is a diagrammatic view illustrating the operation of the transfer means.

With specific reference to the form of the present invention illustrated in the drawings, and referring particularly to FIGS. 1 and 3, a frame for the improved tray-loading apparatus of the present invention is indicated by the reference numeral 10.

To provide a continuous supply of based photoflash lamps 12, a hopper 14 is mounted on the frame 10 and has its delivery end 16 disposed in registry with a plurality of orienting lanes 18 which form a part of an orienting and feeding means and which are adapted to randomly receive the based photoflash lamps 12 and to align them in a desired vertical base-down position. While only four such orienting lanes 18 are shown in FIGS. 4, 5 and 6, it will be understood that eleven such orienting lanes 18 are provided.

*Orienting and Feeding Means*

In order to orient the randomly received based photoflash lamps 12 into the above-mentioned vertical base-down position, a corrugated plate 20 (which is adapted to form the orienting lanes 18 in the valleys between successive corrugations) is mounted on a supporting plate 22 and contained between side plates 24, with such bottom plate 22 being mounted on a vibrator 26 upstanding from the frame 10. The downwardly converging cross section of the orienting lanes 18 supports the envelopes of the lamps 12, but permits the smaller diameter bases to drop downwardly when such bases are vibrated by the vibrator 26. The longitudinal reciprocating movement of such vibrator 26 urges the randomly deposited based photoflash lamps along the orienting lanes from left to right, as viewed in FIGS. 1 and 3, until such based photoflash lamps 12 arrive at the delivery end of the orienting lanes 18, where the bottom portions of the corrugated plate 20 are cut away to permit the vibrated lamps 12 to assume the desired vertical base-down position (FIG. 5) and to permit the bases of such lamps to pass into feeding lanes 28 provided between inverted U-shaped channel members 30 (FIG. 6) mounted on a bottom plate 32 of a feeding means. There is, of course, one feeding lane 28 disposed in longitudinal registry with each orienting lane 18.

Such bottom plate 32 is mounted on a second vibrator 34, the longitudinal reciprocating movement of which causes the oriented lamps 12 to slide off the delivery end of the orienting lanes 18 and to seat themselves in the feeding lanes 28, as shown in FIGS. 3 and 6. Thereafter, such vibrator 34 urges the now oriented lamps 12 (which are seated in the slightly declining feeding lanes 28 and are maintained erect by the packing effect of abutting lamps) toward a like number of aligned guide tubes 36, the entrance portion 38 of which is cut away on the side facing the delivery end of the feeding lanes 28 to permit entrance of such oriented lamps 12 into the associated guide tubes 36.

As shown in FIGS. 3 and 7, the oriented based photoflash lamps 12 gravitate down the eleven guide tubes 36 and are released one at a time through a delivery end 35 of each guide tube 36 by an escapement mechanism 40 into registering lamp-receiving means or lamp holders 42 disposed on a conveyor 44 and in a lamp-delivery position $P_1$ therebeneath.

*Escapement Mechanism*

This escapement mechanism 40 (FIGS. 7 and 8) has eleven levers 46 (only three of which are shown in FIG. 8) commonly pivoted on a rod portion of the frame 10 at 48 (FIG. 7) and connected individually at 50 to upper operating fingers 52, as viewed in FIG. 7, each of which upper operating fingers 52 are reciprocable into and out of its associated guide tube 36. Such levers 46 are also similarly individually connected at 54 to associated lower operating fingers 56 which accordingly are moved in an opposite direction to the upper operating fingers 52 upon oscillatory rotation of the levers 46.

To provide drive means for the escapement mechanism 40 and the other associated means of the tray-loading apparatus of the present invention, a main cam shaft 58 (FIGS. 1, 2 and 14) is driven continuously in clockwise direction, as viewed in FIG. 1, through a chain drive 60 and a gear reduction mechanism 62 by a motor 64. As shown in FIG. 14 such motor 64 is continuously energized by a suitable voltage supply, indicated by the legend "A. C. Supply" and connected thereto by line-voltage conductors 66 and 68. During the above mentioned clockwise rotation of the main cam shaft 58, as viewed in FIG. 1, a cam 70 (FIGS. 2 and 14) causes closure of a normally-open switch 72 thereby energizing coils 74 of two solenoids having their armatures 76 tandemly connected at 78 (FIGS. 7 and 8) to a rod extending between adjacent upper operating fingers 52. In FIGS. 7 and 8 one such solenoid and its armature 76 is shown.

Referring to FIG. 14, it will be noted that the "solenoid-energizing circuit" comprises a conductor 80 extending from the line-voltage conductor 66 through a normally-open switch 82 (FIG. 13) having a spring-biased movable contact 82a operable by a coating tray 84, as hereinafter described, to the closed dotted-line position, shown in FIG. 14 and through the now closed cam-operated switch 72 to one side of the paralleled coils 74 of the solenoids. A suitable conductor 86 connects the other sides of the coils 74 to the other line-voltage conductor 68.

Thus when the movable contact 82a of the tray-operated switch 82 is in the lower dotted-line position, shown in FIG. 14, such coils 74 of the solenoids are energized and the eleven upper operating fingers 52 are moved to the left, as viewed in FIGS. 7 and 8, through a suitable aperture in the side wall of the associated guide tubes 36 into engagement with the leading based photoflash lamps 12 in such guide tubes 36. When the cam-operated switch 72 is opened by the operation of the cam 70 (FIGS. 2 and 14) the solenoid coils 74 are deenergized and spring-biasing means (not shown) on the armatures 76 causes retraction of such armatures 76 to the right. This movement of the armatures 76 results in the withdrawal of the upper operating fingers 52 from the guide tubes 36 with attendant release of the leading based photoflash lamps 12 and the downward advancement of the eleven columns of lamps 12 in the guide tubes 36. Simultaneously, therewith the lower portion of the eleven levers 46 are moved to the left, as shown in FIG. 7 by clockwise rotation of the frame rod 48, to cause insertion of the lower operating fingers 56 into the cut-away delivery ends 35 of the guide tubes 36 to restrain further downward movement of the now released leading based photoflash lamps 12. During the next cycle of operation of the escapement mechanism 40, the leading based photoflash lamps 12 are released by retraction of the lower operating fingers 56 and the next-in-line group of lamps 12 are restrained by insertion of the upper operating fingers 52 with the result that the now released leading lamps 12 pass through the delivery ends 35 of the guide tubes 36 and into the lamp holders 42 disposed on the conveyor 44 in the lamp-delivery position $P_1$ therebeneath.

*Conveyor*

This conveyor 44 (FIGS. 7, 8 and 10) comprises essentially a pair of endless chains 88, each extending around and supported by a pair of sprockets 90 affixed to shafts 92.

In order to provide mounting means for the lamp holders 42 in groups of eleven, thereby adapting such lamp holders 42 to receive eleven based photoflash lamps 12 at a time from the eleven guide tubes 36 as described above, mounting plates 93 (FIGS. 7, 8 and 9) extend transversely across the endless chains 88 at equi-spaced intervals and have their end portions suitably secured as shown in FIG. 8 to links of the endless chains 88. In addition, as shown in FIG. 9, such mounting plates 93 are suitably apertured at 94 to receive the lamp holders 42. To permit the mounting plates 93 to support these lamp holders 42 they are provided with upper flanges 95 which rest on the mounting plates 93 and such lamp holders 42 are retained in the apertures 94 by snap rings 96.

In order to cause the indexing of the loaded lamp holders 42 from the lamp-delivery position $P_1$ adjacent the delivery ends 35 of the guide tubes 36 in step by step movement to the right, as viewed in FIG. 7, to the lamp-transfer position $P_2$, a ratchet wheel 98 is affixed to the right-hand shaft 92, as viewed in FIG. 7, and an advancing pawl 100 is freely pivoted at 104 on an arm 106 on such right-hand shaft 92. This advancing pawl 100 is biased by spring means (not shown) into engagement with notches 108 equi-spaced about the periphery of the ratchet wheel 98. The means utilized to lock the ratchet wheel in the advanced or indexed position comprises a spring-biased pin 109 (FIG. 7) projecting from a bracket 110 mounted on the frame 10, which pin 109 is engageable in sockets 111 disposed in equi-spaced relationship on the ratchet wheel 98.

The drive means utilized to move the advancing pawl 100 from right to left, as viewed in FIG. 7, to cause resultant clockwise movement of the ratchet wheel 98 and attendant movement of the upper portions of the endless chains 88 and the loaded lamp holders 42 from left to right, comprises a lever 112 (FIGS. 1, 2, 7 and 10) pivoted on the frame at 113 (FIG. 1); a slotted link 114 for connecting the advancing-pawl pivot 104 to the lever 112 at 116; and a cam lever 118 pivoted at 120 (FIG. 1) on the frame 10 and driven by a cam 122 on the main cam shaft 58 (FIGS. 1 and 2), which cam lever 118 is connected to the first mentioned lever 112 by a link 124.

As shown particularly in FIGS. 1 and 7, the above-mentioned connection 116 between the first mentioned lever 112 and the slotted link 114 comprises a headed pin which is normally seated in an upwardly extending portion 126 of an L-shaped slot 128 provided in such slotted link 114.

It will be appreciated from a consideration of FIGS. 1, 2 and 7 as above mentioned, that the clockwise rotation of the cam 122 together with the aforesaid linkage causes movement of the advancing pawl 100 to the left, as viewed in FIG. 1, into engagement with the left-hand squared end of a notch 108, thereby causing clockwise rotation of the ratchet wheel 98 and the resultant indexing of the groups of eleven based photoflash lamps 12 (in the lamp holders 42 on the upper reaches of the endless chains 88) intermittently one index length to the right along their path of movement from the lamp-delivery position $P_1$ to the lamp-transfer position $P_2$. During this indexing movement of the advancing pawl 100, the spring-biased locking pin 109 rides out of its engaged socket 111, across the face of the ratchet wheel 98 and into the next socket 111, to lock the ratchet wheel 98 in the advanced position (not shown).

Further clockwise movement of the cam 122, as viewed in FIG. 1 (through operation of the above-described linkage), causes the advancing pawl 100 to move to the right from the advanced position (not shown) to the position shown in FIG. 7. During this retracting movement the locking means maintains the ratchet wheel 98 in the advanced position while the advancing pawl 100 slides over the rounded back portion of the advancing notch 108, along the periphery of the ratchet wheel 98 and into the next notch 108, in the position shown in FIG. 7, whereupon the indexing cycle of the conveyor 44 is repeated.

When a group of eleven based photoflash lamps 12 in the lamp holders 42 arrive at the lamp-transfer position $P_2$, the lamps are transferred by a transfer means from the lamp holders 42 to a coating tray 84 disposed in an adjacent lamp-loading position $P_3$.

*Transfer Means*

In order to provide means for removing the based photoflash lamps 12 from the eleven lamp holders 42 on the conveyor 44 (which loaded lamp holders 42 are disposed in the lamp-transfer position $P_2$, FIGS. 7 and 10) and inserting them into eleven base-receiving sockets 130 (FIGS. 10 and 12) in the coating tray 84 and disposed in the lamp-loading position $P_3$ (FIG. 10), eleven transfer heads 132 are mounted in the required equi-spaced relationship in a housing 134.

Each transfer head 132 comprises essentially a body 136 (FIG. 10) provided with a resilient envelope-engaging cup 138 secured to its lower end and a rigid tube 140 extending through the housing 134 and communicating with the cup 138. A compression spring 142 biases the integrated body 136, cup 138 and tube 140 to permit limited reciprocable movement of these integrated elements with respect to the housing 134 during the lamp pick-up operation and lamp-inserting operation as hereinafter explained in detail.

The movement of the transfer heads 132 is indicated diagrammatically in FIG. 15 from which it will be noted that when the eleven loaded lamp-holder heads 42 have indexed into the lamp-transfer position $P_2$, the transfer heads 132 are positioned at "A" (the upper dotted-line position in FIG. 10) preparatory for their downward movement to position "B" (indicated by the lower dotted-line position "B" in FIG. 10) to remove the eleven based photoflash lamps 12 from such lamp holders 42. This vertical downward movement (FIG. 15) is accomplished by a vertical-reciprocating mechanism of the transfer means.

Vertical Reciprocating Mechanism

For the purpose of causing this downward movement of the transfer heads 132 from position "A" to position "B" in FIG. 15, the housing 134 is pivotally connected by means of two pairs of brackets 144, FIGS. 2 and 10 (one pair of brackets 144 being disposed at either end of the housing 134), to vertical links 146. In turn, each pair of vertical links 146 are connected by a generally horizontal link 148 to a pivot 150 on a counter-weighted rocker block 152 (FIG. 1). This rocker block 152 is secured to a shaft 154 journalled in bearings 156 (FIG. 2) on the frame 10.

To provide drive means for rotating the rocker block 152 in counterclockwise direction, as viewed in FIGS. 7 and 10, to achieve the above-mentioned downward movement of the transfer heads from position "A" to position "B" (FIGS. 10 and 15) an arm 158 is affixed to the shaft 154 (FIGS. 2 and 7) and connected by a connecting rod 160 (FIGS. 1, 2 and 7) to a cam lever 162 pivoted at 164 on the frame 10 with such lever 162 being driven by a cam 166 (FIG. 2). Through this above-described linkage, the clockwise rotation of the cam 166 causes similar clockwise rotation of the rocker block 152 from the upper dotted-line position (indicated by "A" in FIG. 10) to the lower dotted-line position (indicated in such figure by the reference letter "B") to move the resilient cups 138 on the transfer heads 132 down over the envelopes of the based photoflash lamps 12 in the lamp holders 42.

It will be understood that while the parallelogram-type mounting provided for the transfer heads 132 by the vertical parallel links 146 and the link 148 permits the transfer heads 132 to move vertically from "A" to "B" (FIG. 15) during rotation of the rocker block 152, guide means are required to insure such vertical movement. To achieve this vertical guided motion of the transfer heads 132, the housing 134 is provided with two pairs of rollers 168 (FIG. 2), one pair being disposed at either end thereof. Such rollers 168 are engageable in associated vertical guides 170 affixed to a horizontal slide 172, utilized as hereinafter explained for the horizontal movement of the transfer heads 132.

From a consideration of FIGS. 2, 7 and 10, it will be appreciated that the clockwise turning of the rocker block 152 from the upper-dotted line position "A" of FIG. 10, to the lower dotted-line position "B" shown in such figure is translated by the pivoted parallelogram mounting afforded by the vertical links 146 and links 148 into guided vertical movement of such transfer heads 132 when the rollers 168 (FIG. 2) ride downwardly on the vertical guides 170.

After the resilient cups 138 have been inserted over the envelopes of the based photoflash lamps 12 at position P₂, the lamps 12 are secured in such cups 138 by vacuum means provided by a pumping system, as now described. Such pumping system has a flexible tube 174 (FIGS. 2 and 10) extending from the rigid tube 140 of each transfer head 132 to a manifold 176 secured to the right-hand vertical links 146, as viewed in FIG. 10. As shown in FIG. 2, the opposite ends of the manifold 176 are connected by flexible lines 178 and rigid lines 180 to an emergency shut-off valve 181 and to an air valve 182 (FIG. 2) operable by a cam 184 on the main cam shaft 58 to connect (through the above-described lines 178 and 180) the manifold 176 with a vacuum tank 186 (FIG. 1). The emergency valve 181 is electrically operable (FIG. 14) to remain open while energized. This vacuum tank 186 is evacuated by a pump 188, driven by a motor 190 which is in parallel with the drive motor 64 (FIG. 14). At the desired time, the cam 184 causes the evacuation of the transfer heads 132, thereby securing the based photoflash lamps 12 in the cups 138.

The transfer heads 132 and the now vacuum-secured based photoflash lamps 12 are moved upwardly (FIGS. 10 and 15), while lamp holders 42 are still at position P₂, from their position "B" to position "A" by operation of the above-described vertical-reciprocating mechanism, preparatory to the horizontal movement of such transfer heads to position "C" (FIG. 15) by operation of a horizontal-reciprocating mechanism. At position "C" the transfer heads 132 are disposed in alignment with, but above the eleven base-receiving sockets 130 in the coating tray 84 at the lamp-loading position P₃.

Horizontal-Reciprocating Mechanism

To achieve this horizontal movement of the transfer heads from "A" to "C" (FIG. 15), the above-mentioned horizontal slide 172 is connected at 190 (FIGS. 7 and 10) to the lever 112, which it will be remembered is associated with the indexing means for the conveyor 44. It will be appreciated from a consideration of FIG. 7 that during the retracting movement of the advancing pawl 100, the clockwise rotation of the lever 112, as viewed in FIGS. 7 and 10, will cause the simultaneous horizontal movement of the horizontal slide 172 (in a horizontal guide 192 provided in the frame 10) from left to right, as viewed in FIG. 10, thereby carrying the vertical guides 170 affixed to such horizontal slide 172, the housing 134 and the eleven now-loaded transfer heads 132 from position "A" to position "C," FIG. 15.

Further operation of the vertical-reciprocating mechanism causes movement of the transfer heads 132 downwardly from position "C," FIG. 15, to position "D" (the solid-line position shown in FIG. 10) to move the bases of the eleven based photoflash lamps 12 through closed guides 194 (FIGS. 10 and 11) and insert such bases (against the action of the springs 142 within the transfer heads 132) into the eleven resilient base-receiving sockets 130 in the coating tray 84, which sockets 130 are disposed at the lamp-loading position P₃. During this movement of the transfer heads 132 from position "C" to position "D," the rollers 168 ride off the vertical guides 170 and along fixed lower guides (FIG. 2) on the frame 10 at the lamp-loading position P₃ to align the transfer heads 132 with the sockets 130. These guides 194 (FIGS. 10 and 11) each comprise a fixed jaw 194a and a movable jaw 194b, which movable jaws 194b are connected at 194c to a slide 194d. This slide 194d is connected by a link 194e to a cam-driven lever 194f which causes opening and closing of the movable jaws 194b.

Thereafter further operation of the valve cam 184 (FIG. 2) causes the air valve 182 to disconnect the stationary lines 180 from the vacuum tank 186 and pump 188 and to connect such stationary lines 180 to the atmosphere. As a result of the atmospheric pressure admitted to the transfer heads 132 (through lines 180 and 178, manifold 176, lines 174 and tubes 140), the vacuum is destroyed loosening the grip of the resilient cups 138 on the envelopes of the based photoflash lamps 12 (now secured in the base-receiving heads 130) so that when the transfer heads 132 are retracted upwardly from position "D" (FIG. 15) to position "C," by operation of the vertical reciprocating mechanism, the lamps 12 remain in the base-receiving sockets 130.

During the horizontal movement of the now empty transfer heads 132 from position "C" (FIG. 15) to position "A" (the starting position) by operation of the horizontal reciprocating mechanism, it will be understood that the next group of eleven loaded lamp holders 42 on the conveyor 44 are indexed into the lamp-transfer position P₂ and that the coating tray 84 is indexed simultaneously therewith one position to the left, as viewed in FIG. 10, by a suitable indexing mechanism.

Indexing Mechanism for Coating Trays

This indexing mechanism for the coating trays 84 (FIGS. 2 and 10) has a plurality of pairs of outer dogs 212 affixed to the frame 10 (FIG. 2) which outer dogs 212 are spring-biased upwardly into engagement with transversely extending notches 214 (FIG. 10) provided in the coating trays 84. Although the outer dogs 212 are not shown in FIG. 10, it will be appreciated that a pair of outer dogs 212 is mounted in alignment with each one of three indexing dogs 216 shown in such FIG. 10.

It will be noted in FIG. 10 that a center indexing dog 216 is in engagement with a notch 214 in the coating tray 84 adjacent the lamp-loading position $P_3$; that the left-hand indexing dog 216 is in engagement with the coating tray ahead of the lamp-loading position $P_3$; and that the right-hand indexing dog 216 engages the coating tray 84 behind the lamp-loading position $P_3$.

In order to permit the simultaneous indexing of the three above-mentioned coating trays 84 one notch length (or one row of sockets 130) to the left per index, the three indexing dogs 216 are mounted on a slide 218, which is horizontally reciprocable in guides 220 (FIGS. 2 and 10) and is provided with depending brackets 222. To provide operating means for horizontally reciprocating the above-mentioned slide 218, a link 224 connects the brackets 222 to a lever 226 pivoted at 228 and driven by a cam 230 on the main cam shaft 58 (FIG. 2).

After a group of eleven based photoflash lamps 12 have been inserted into the eleven base-receiving sockets 130 of the coating tray 84 at the lamp-loading position $P_3$ and the transfer heads 132 have moved upwardly from position "D" (FIG. 15) to position "C," the cam 230 actuates the indexing mechanism for the coating trays 84 simultaneously with the movement of the transfer heads 132 from position "C," FIG. 15, to position "A." Through the above-described linkage, the slide 218 and the three advancing dogs 216 and the three engaged coating trays 84 are moved to the left one notch length, as viewed in FIG. 10, to position an unfilled row of base-receiving sockets 130 at the lamp-loading position $P_3$. During this indexing movement the advanced coating trays 84 slide past the spring-biased fixed outer dogs 212, which engage the next presented notches 214 in the three coating trays 84.

These outer dogs 212 maintain the three coating trays 84 in the advanced position during retraction of the slide 218 and the three indexing dogs 216 carried thereby to the right (FIG. 10) by further operation of the indexing mechanism, which movement permits the advancing dogs 216 to engage the next set of notches 214 preparatory for the next indexing movement.

It will be noted from a consideration of FIG. 1 that the loaded coating trays 84 are moved to the left by the indexing mechanism onto a belt-type conveyor 232 which transports them to a gravity type chute 234 leading to the coating tanks (not shown). This belt-type conveyor 232 is driven by means of a belt drive 236 from the gear-reduction mechanism 62.

It will be remembered that one of the defects of the conventional tray-loading apparatus as hereinbefore mentioned was the continued operation of such apparatus even though a coating tray 84 was absent from the lamp-loading position $P_3$. To overcome this defect, control means are provided which is operable by the absence of a coating tray 84 in the loading position $P_3$, to terminate the operation of the vibrators 26 and 34 (FIG. 1), the escapement mechanism 40 (FIG. 2), the indexing of the conveyor 44 (FIG. 7) and the operation of the transfer means.

Control Means

In FIG. 14, a "vibrator-energizing" circuit is shown comprising a conductor 238 extending from the line-voltage conductor 68 to one side of the vibrators 26 and 34 and a line 240 connecting the other side of the vibrators 26 and 34 to a junction with the conductor 80, which conductor 80 leads to the tray-operated switch 82 and thence to the other line-voltage conductor 66 (FIGS. 2 and 13).

It is obvious that in the event a coating tray 84 is not present at the loading position $P_3$ the spring-biased movable contact 82a of the tray-operated switch 82 will remain in the solid-line position, shown in FIG. 14, and the "vibrator-energizing" circuit cannot then be energized.

In addition, when the movable contact 82a of the tray-operated switch 82 is in the upper or solid-line position, shown in FIG. 14, the hereinbefore described "solenoid-energizing" circuit associated with the escapement mechanism 40 simultaneously remains unenergized, thereby immobilizing such escapement mechanism 40.

In order to prevent indexing of the conveyor 44 in this emergency situation, one side of a coil 240 of a solenoid 241 is connected by a conductor 242 to the upper contact 243 (FIG. 14) of the tray-operated switch 82 and the other side of the coil 240 is joined by a conductor 244 to a junction with the conductor 86. When the movable contact 82a of the tray-operated switch 82 is in the solid-line position, shown in FIG. 14, the coil 240 of the solenoid 241 is energized thereby causing an armature 246 (connected by a link 248, FIG. 7, to the slotted link 114) to move such slotted link 114 upwardly, as viewed in FIG. 7, thus positioning the headed pin 116 in registry with the longitudinally extending portion 247 of the aforesaid L-shaped slot 128 in link 114. Thus, when the indexing mechanism for the conveyor 44 moves the headed pin 116 to the left, when viewed in FIG. 7, such headed pin 116 moves along the longitudinal portion 247 of the slot 128 in the slotted link 114 without causing similar movement of the advancing pawl 100, with the obvious result being that such conveyor 44 is not indexed.

As shown in FIG. 14, the electrically operated normally-closed shut-off valve 181 disposed in the lines 180 is connected in parallel across the conductors 240 and 244, so that when the movable contact 82a of the tray-loaded switch 82 is in the solid-line position, shown in FIG. 14, such normally-open shut-off valve 181 is unenergized and remains closed even though the solenoid 240 is energized, with the obvious result that while the transfer means moves through the above-described path of movement (FIG. 15) the based photoflash lamps 12 at the lamp-transfer position $P_2$ are not removed from the lamp holders 42 on the conveyor 44, because of the absence of a vacuum until valve 181 is again energized by movement of trays 84.

It will be recognized by those skilled in the art that the objects of the present invention have been achieved by the provision of an improved tray-loading apparatus which operates under controlled conditions thereby preventing jamming of the based photoflash lamps in such apparatus and which remains inoperative when a coating tray is not in position to receive such lamps. In addition, the improved tray-loading apparatus efficiently and consistently loads aluminum-based photoflash lamps having their centers of gravity near the center of the lamp envelopes, which lamps normally recline under the influence of gravity in a position closely approaching the horizontal thereby reducing the shrinkage of the tray-loading operation.

Also, a novel orienting and feeding means is provided whch randomly receives based photoflash lamps having their centers of gravity near the bulbous envelopes and which normally gravitate to a generally horizontal position, orients such photoflash lamps into a desired vertical base-down position and presents the oriented lamps to a lamp-delivery position. Further, transfer means are provided for transferring groups of oriented lamps disposed in a lamp-transfer position located in one horizontal plane to a lamp-loading position disposed in another horizontal plane.

While in accordance with the patent statutes one best known embodiment of the present invention has been illustrated and described in detail, it is to be particularly understood that the invention is not limited thereto or thereby.

We claim:

1. Apparatus for loading based-bulbous articles into a tray disposed in a loading zone at one level, comprising article-receiving means disposed at a second level and adapted to receive a plurality of oriented based-bulbous articles at a delivery zone in said second level, said article-receiving means being operable to move such articles away from said delivery zone to a transfer zone at said second level, means at a third level and adjacent the delivery zone, said means being operable to orient the based-bulbous articles in the base-down position while the latter are disposed in said third level and for feeding such oriented based-bulbous articles to said article-receiving means at said second level, transfer means in the transfer zone operable to remove a group of based-bulbous articles from the article-receiving means at said second level and to deposit such group in the tray at said one level, and control means operable by the absence of a tray in the loading zone to terminate the operation of said article-orienting and feeding means as well as said transfer means, and to arrest the movement of said article-receiving means.

2. Apparatus for loading based-bulbous articles into a tray disposed in a loading zone at one level, comprising article-receiving means disposed at a second level and adapted to receive a plurality of oriented based-bulbous articles at a delivery zone in said second level, said article-receiving means being operable to move such articles away from said delivery zone to a transfer zone at said second level, means at a third level and adjacent the delivery zone, said means being operable to orient the based-bulbous articles in the base-down position while the latter are disposed in said third level and for feeding such oriented based-bulbous articles to said article-receiving means at said second level, escapement means on the article orienting and feeding means for metering the feeding of the oriented articles to the article-receiving means, transfer means in the transfer zone operable to remove a group of based-bulbous articles from the article-receiving means at said second level and to deposit such group in the tray at said one level, and control means connected to said escapement means and operable by the absence of a tray in the loading zone to terminate the operation of said escapement means and hence the article-orienting and feeding means, said control means also being operable to terminate the movement of the article-receiving means and the operation of the transfer means.

3. Apparatus for loading based-bulbous articles into a tray disposed in a loading zone at one level, comprising article-receiving means disposed at a second level and adapted to receive a plurality of oriented based-bulbous articles at a delivery zone in said second level, advancing means connected to said article-receiving means and operable to move said article-receiving means and such articles carried thereby away from said delivery zone to a transfer zone at said second level, means at a third level and adjacent the delivery zone, said means being operable to orient the based-bulbous articles in the base-down position while the latter are disposed in said third level and for feeding such oriented based-bulbous articles to said article-receiving means at said second level, transfer means in the transfer zone operable to remove a group of based-bulbous articles from the article-receiving means at said second level and to deposit such group in the tray at said one level, and control means connected to said advancing means and operable by the absence of a tray in the loading zone to immobilize said advancing means, said control means also being operable to terminate the operation of the article-orienting and feeding means and the operation of the transfer means.

4. Apparatus for loading based-bulbous articles into a tray disposed in a loading zone at one level, comprising article-receiving means disposed at a second level and adapted to receive a plurality of oriented based-bulbous articles at a delivery zone in said second level, said article-receiving means being operable to move such articles away from said delivery zone to a transfer zone at said second level, means at a third level and adjacent the delivery zone, said means being operable to orient the based-bulbous articles in the base-down position while the latter are disposed in said third level and for feeding such oriented based-bulbous articles to said article-receiving means at said second level, transfer means in the transfer zone operable to remove a group of based-bulbous articles from the article-receiving means at said second level and to deposit such group in the tray at said one level, said transfer means having article pick-up means adapted to receive said oriented articles therein, vacuum means associated with said article pick-up means for securing the received oriented articles in the article pick-up means, and control means connected to said vacuum means and operable by the absence of a tray in the loading zone to shut off the vacuum means thereby immobilizing said transfer means, said control means also being operable to terminate the operation of the article-orienting and feeding means and the movement of the article-receiving means.

5. Apparatus for loading based-bulbous articles into a tray disposed in a loading zone at one level, comprising article-receiving means disposed at a second level and adapted to receive a plurality of oriented based-bulbous articles at a delivery zone in said second level, advancing means connected to said article-receiving means and operable to move said article-receiving means and such articles carried thereby away from said delivery zone to a transfer zone at said second level, means at a third level and adjacent the delivery zone, said means being operable to orient the based-bulbous articles in the base-down position while the latter are disposed in said third level and for feeding such oriented based-bulbous articles to said article-receiving means at said second level, escapement means on the article-orienting and feeding means for metering the feeding of oriented articles to the article-receiving means, transfer means in the transfer zone operable to receive a group of based-bulbous articles from the article-receiving means at said second level and to deposit such group in the tray at said one level, said transfer means having article pick-up means adapted to receive said oriented articles therein, vacuum means associated with said article pick-up means for securing the received oriented articles in the article pick-up means, and control means connected to said advancing means, said escapement means and said vacuum means and operable by the absence of a tray in the loading zone to immobilize said advancing means, terminate the operation of said escapement means and to shut-off the vacuum means, thereby immobilizing said apparatus.

6. Apparatus for orienting bulbous articles, said articles having a larger-diameter portion on one end and a relatively smaller-diameter portion on the other end and also having their centers of gravity disposed adjacent the larger-diameter portions and adapted to lie under the influence of gravity in a generally horizontal plane, said apparatus comprising an article-supporting means adapted to support the larger-diameter portions of the articles and provided with an orienting lane operable to randomly receive said articles at one end and to permit the smaller-diameter portions to be moved below said larger-diameter portions, said article-supporting means being provided with an aperture at the other end of said orienting lane, a vibratory means connected to said article-supporting means and operable to move the smaller-diameter portions of said articles on said orienting lane slightly below the larger-diameter portions and to move them into engagement with each other as they move along said orienting lane, thereby urging the smaller-diameter portions downwardly through said aperture and orienting said articles with their longitudinal axes in a vertical plane.

7. Apparatus for orienting bulbous articles and feeding said articles to a delivery zone, said articles having a larger-diameter portion on one end and a relatively smaller-diameter portion on the other end and also having their centers of gravity disposed adjacent the larger-diameter portions and adapted to lie under the influence of gravity in a generally horizontal plane, said apparatus comprising an article-supporting means being adapted to support the larger-diameter portions of the articles and provided with an orienting lane operable to randomly receive said articles at one end and to permit the smaller-diameter portions to be moved below said larger-diameter portions, said article-supporting means being provided with an aperture at the other end of said orienting lane, a first vibratory means connected to said article-supporting means and operable to move the smaller-diameter portions of said articles on said orienting lane slightly below the larger-diameter portions and to move the articles into engagement with each other as they move along said orienting lane thereby urging the smaller-diameter portions downwardly through said aperture and orienting said articles with their longitudinal axes in a vertical plane, a feeding lane in registry with said orienting lane and provided with a delivery end, said feeding lane being adapted to receive the oriented articles from the orienting lane and a second vibratory means connected to said feeding lane and operable to maintain said oriented articles in abutting engagement, which engagement maintains the oriented position of the articles, said second vibratory means being operable to move said oriented articles toward the delivery end.

8. Apparatus for orienting bulbous articles at one level and feeding said articles to a delivery zone at another level, said articles having a larger-diameter portion on one end and a relatively smaller-diameter portion on the other end and also having their centers of gravity disposed adjacent the larger-diameter portions and adapted to lie under the influence of gravity in a generally horizontal plane, said apparatus comprising an article-supporting means being adapted to support the larger-diameter portions of said articles and provided with an orienting lane operable to randomly receive said articles at one end and to permit the smaller-diameter portions to be moved below said larger-diameter portions, said article supporting means being provided with an aperture at the other end of said orienting lane, a first vibratory means connected to said article-supporting means and operable to move the smaller-diameter portions of said articles on said orienting lane slightly below the larger-diameter portions and to move them into engagement with each other as they move along said orienting lane, thereby urging the smaller-diameter portions downwardly through said aperture and orienting said articles with their longitudinal axes in a vertical plane, a feeding lane in registry with said orienting lane and provided with a delivery end disposed at said one level, said feeding lane being adapted to receive the oriented articles from the orienting lane, a second vibratory means connected to said feeding lane and operable to maintain said oriented articles in abutting engagement, which engagement maintains the oriented position of the oriented articles, said second vibratory means being operable to move said oriented articles toward the delivery end and guide means at the delivery end of such feeding lane adapted to receive said oriented articles, one at a time, from the delivery end of said feeding lane and operable to deliver said articles to said other level.

9. Apparatus for orienting bulbous articles at one level and feeding said articles to a delivery zone at another level, said articles having a larger-diameter portion on one end and a relatively smaller-diameter portion on the other end and also having their centers of gravity disposed adjacent the larger-diameter portions and adapted to lie under the influence of gravity in a generally horizontal plane, said apparatus comprising an article-supporting means being adapted to support the larger-diameter portions of the articles and provided with an orienting lane operable to randomly receive said articles at one end and to permit the smaller-diameter portions to be moved below said larger-diameter portions, said article supporting means being provided with an aperture at the other end of said orienting lane, a first vibratory means connected to said article-supporting means and operable to move the smaller-diameter portions of said articles below the larger-diameter portions and to move the articles into engagement with each other as they move along said orienting lane, thereby urging the smaller-diameter portions downwardly through said aperture and orienting said articles with their longitudinal axes in a vertical plane, a feeding lane in registry wih said orienting lane and provided with a delivery end disposed at said one level, said feeding lane being adapted to receive the oriented articles from the orienting lane, a second vibratory means connected to said feeding lane and operable to maintain said oriented articles in abutting engagement, which engagement maintains the oriented position of the oriented articles, said second vibratory means being operable to move said oriented articles toward the delivery end, guide means at the delivery end of such feeding lane adapted to receive said oriented articles, one at a time, from the delivery end of said feeding lane and operable to deliver said articles to said other level and escapement means on said guide means operable to release said articles one at a time from the guide means to the delivery zone.

10. Apparatus for orienting bulbous articles at one level and feeding said articles to a tray in a delivery zone at another level, said articles having a larger-diameter portion on one end and a relatively smaller-diameter portion on the other end and also having their centers of gravity disposed adjacent the larger-diameter portions and adapted to lie under the influence of gravity in a generally horizontal plane, said apparatus comprising an article-supporting means being adapted to support the larger-diameter portions of the articles and provided with an orienting lane operable to randomly receive said articles at one end and to permit the smaller-diameter portions to be moved below said larger-diameter portions, said article-supporting means being provided with an aperture at the other end of said orienting lane, a first vibratory means connected to said article-supporting means and operable to move the smaller-diameter portions of said articles on said orienting lane slightly below the larger-diameter portions and to move them into engagement with each other as they move along said orienting lane, thereby urging the smaller-diameter portions downwardly through said aperture and orienting said articles with their longitudinal axes in a vertical plane, a feeding lane in registry with said orienting lane and provided with a delivery end disposed at said one level, said feeding lane being adapted to receive the oriented articles from said orienting lane, a second vibratory means connected to said feeding lane and operable to maintain said oriented articles in abutting engagement, which engagement maintains the oriented position of the oriented articles, said second vibratory means being operable to move said oriented articles toward the delivery end, guide means at the delivery end of such feeding lane adapted to receive said oriented articles, one at a time, from the delivery end of said feeding lane and operable to deliver said articles to said tray at the other level, escapement means on said guide means operable to release said articles one at a time from the guide means to the tray in the delivery zone, and control means operable by the absence of a tray in the delivery zone to terminate the operation of the escapement mechanism.

11. Apparatus for transferring a plurality of oriented articles disposed at one level in a transfer zone from said transfer zone to an adjacent loading zone located at another level, said apparatus comprising article pick-up means adapted to secure said oriented articles therein, a first drive mechanism associated with said article pick-up means and operable to move said article pick-up means and said articles along a path of movement from said one level to a reference level thus permitting said article pick-up means and said articles to clear said one level and then from said reference level to said other level, a second drive mechanism connected to said article pick-up means and operable to move said article pick-up means and said articles from said transfer zone to said loading zone, guide means in said loading zone for guiding said oriented articles into said loading zone when in the closed position, and means connected to said guide means for opening the guide means to permit movement of the oriented articles from the loading zone.

12. Apparatus for transferring a plurality of oriented articles disposed at one level in a transfer zone from said transfer zone to a tray disposed at another level in an adjacent loading zone, said apparatus comprising article pick-up means adapted to receive said oriented articles therein, vacuum means associated with said article pick-up means for securing the received articles in the article pick-up means, means connected to said vacuum means and responsive to the absence of a tray in said loading zone to immobilize said vacuum means to prevent securement of said articles in said article pick-up means, a first reciprocating mechanism associated with said article pick-up means and operable to reciprocate said article pick-up means between said levels and a second reciprocating mechanism connected to said article pick-up means and operable to reciprocate said article pick-up means between said transfer zone and the tray in said loading zone.

13. Apparatus for transferring a plurality of oriented articles disposed at one level in a transfer zone from said transfer zone to a tray disposed at another level in an adjacent loading zone, said apparatus comprising mounting means responsive to oscillating movement at one end to cause longitudinal straight-line movement at the other end, article pick-up means on said other end of the mounting means and adapted to receive said oriented articles therein, vacuum means connected to said article pick-up means for securing the received articles in the article pick-up means, an oscillating mechanism connected to said one end of the mounting means and operable to reciprocate said article pick-up means between said levels, control means connected to said vacuum means and responsive to the absence of said tray in said loading zone to immobilize said vacuum means and prevent securement of said oriented articles in said article pick-up means and a reciprocating mechanism connected to said article pick-up means and operable to reciprocate said article pick-up means between said transfer zone and the tray in said loading zone.

References Cited in the file of this patent

UNITED STATES PATENTS

| | | |
|---|---|---|
| 2,060,645 | Suppiger et al. | Nov. 10, 1936 |
| 2,549,322 | McKinsey | Apr. 17, 1951 |
| 2,649,231 | Ferguson et al. | Aug. 18, 1953 |
| 2,656,656 | Murdoch et al. | Oct. 27, 1953 |
| 2,760,318 | Brenneck et al. | Aug. 28, 1956 |
| 2,823,946 | Okulitch et al. | Feb. 18, 1958 |
| 2,904,944 | Notredame et al. | Sept. 22, 1959 |

FOREIGN PATENTS

| | | |
|---|---|---|
| 800,073 | Great Britain | Aug. 20, 1958 |